United States Patent
Halle

(10) Patent No.: US 11,321,097 B2
(45) Date of Patent: May 3, 2022

(54) SUPER-THREAD PROCESSOR

(71) Applicant: Intensivate, Inc., Berkeley, CA (US)

(72) Inventor: Kevin Sean Halle, Berkeley, CA (US)

(73) Assignee: Intensivate Inc., Berkeley, CA (US)

( * ) Notice: Subject to any disclaimer, the term of this patent is extended or adjusted under 35 U.S.C. 154(b) by 0 days.

(21) Appl. No.: 16/596,417

(22) Filed: Oct. 8, 2019

(65) Prior Publication Data

US 2020/0034153 A1 Jan. 30, 2020

Related U.S. Application Data

(63) Continuation-in-part of application No. 15/900,760, filed on Feb. 20, 2018, now Pat. No. 10,437,603.

(60) Provisional application No. 62/911,368, filed on Oct. 6, 2019, provisional application No. 62/620,032, filed on Jan. 22, 2018, provisional application No. 62/501,780, filed on May 5, 2017, provisional application No. 62/460,909, filed on Feb. 20, 2017.

(51) Int. Cl.
*G06F 9/30* (2018.01)
*G06F 9/38* (2018.01)
*G06F 15/82* (2006.01)

(52) U.S. Cl.
CPC ........ *G06F 9/3869* (2013.01); *G06F 9/30109* (2013.01); *G06F 9/3802* (2013.01); *G06F 15/82* (2013.01)

(58) Field of Classification Search
CPC ......... G06F 9/30; G06F 9/3851; G06F 9/3802
See application file for complete search history.

(56) References Cited

U.S. PATENT DOCUMENTS

| | | | |
|---|---|---|---|
| 2006/0206686 A1* | 9/2006 | Banerjee | G06F 12/1027 711/205 |
| 2007/0113053 A1 | 5/2007 | Jensen et al. | |
| 2009/0254907 A1 | 10/2009 | Neary | |
| 2011/0078414 A1 | 3/2011 | Olson et al. | |
| 2011/0099355 A1* | 4/2011 | Tran | G06F 1/324 712/217 |

(Continued)

OTHER PUBLICATIONS

Hoozemans, et al., "Multiple Contexts in a Multi-ported WLIW Register File Implementation", 2015 International Conference on Reconfigurable Computing and FPGAS (RECONFIG), IEEE, Dec. 7, 2015, pp. 1-6.

(Continued)

*Primary Examiner* — Corey S Faherty
(74) *Attorney, Agent, or Firm* — Rimon Law, P.C.

(57) ABSTRACT

The disclosed inventions include a processor apparatus and method that enable a general purpose processor to achieve twice the operating frequency of typical processor implementations with a modest increase in area and a modest increase in energy per operation. The invention relies upon exploiting multiple independent streams of execution. Low area and low energy memory arrays used for register files operate a modest frequency. Instructions can be issued at a rate higher than this frequency by including logic that guarantees the spacing between instructions from the same thread are spaced wider than the time to access the register file. The result of the invention is the ability to overlap long latency structures, which allows using lower energy structures, thereby reducing energy per operation.

22 Claims, 8 Drawing Sheets

(56) References Cited

U.S. PATENT DOCUMENTS

2012/0036509 A1\* 2/2012 Srinivasan .............. G06F 9/526
718/102
2014/0282565 A1 9/2014 Jaleel et al.

OTHER PUBLICATIONS

Costan, et al., "Sanctum: Minimal Hardware Extensions for Strong Software Isolation", USENIX, The Advanced Computing Systems Association, Jan. 6, 2017, pp. 857-885.
Li, et al., "A Multithreaded Processor Core with Low Overhead Context Switch for IP-packet Processing", Solid-State and Integrated Circuit Technology (ICSICT), 2010 10th IEEE International Conference on, IEEE, Piscataway, NJ, USA, Nov. 2, 2010, pp. 272-274.
EP18754783.1, Extended European Search Report, dated Dec. 9, 2020.
PCT/US2020/054858, ISR and WO dated Jan. 28, 2021.

\* cited by examiner

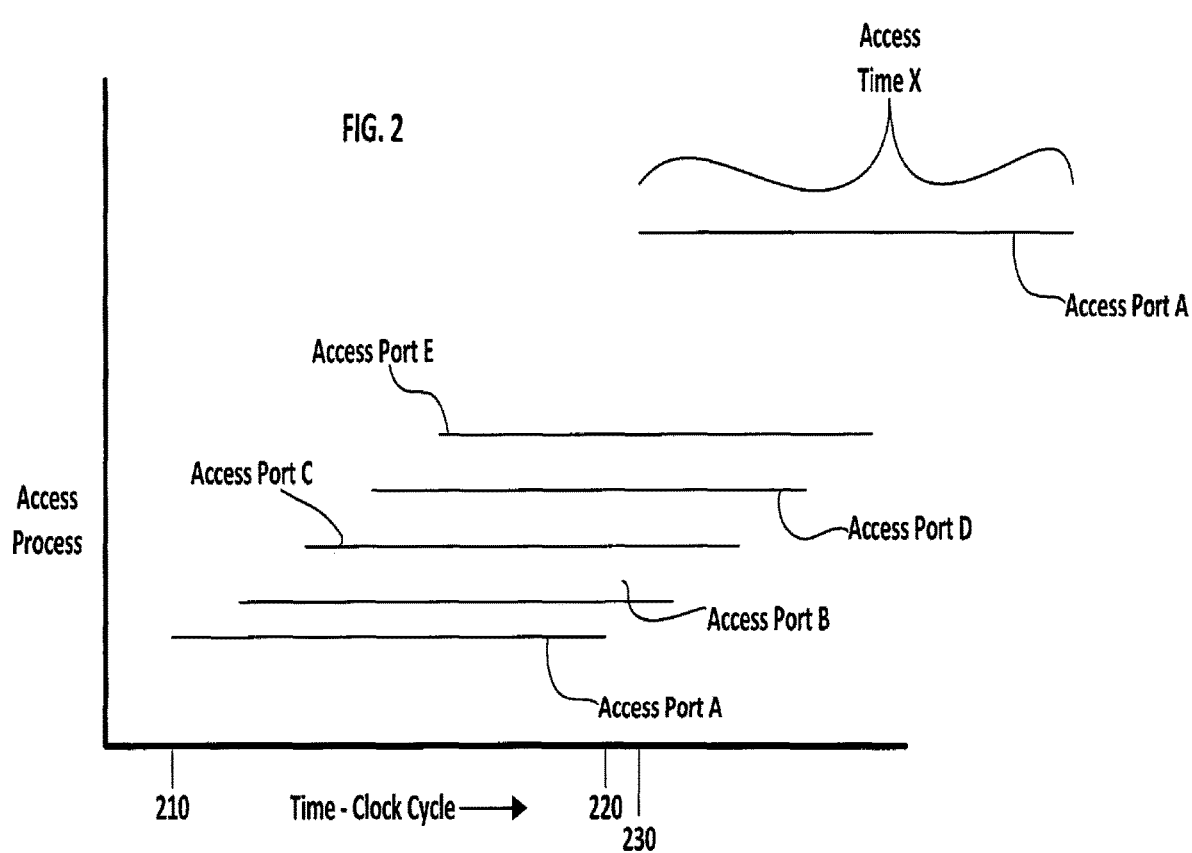

To Sheet 2

SUPER-THREAD PROCESSOR

CROSS REFERENCE TO PRIOR APPLICATIONS

This application is a Continuation of U.S. non-provisional patent application Ser. No. 15/900,760 filed Feb. 20, 2018; which in turn claims benefit and priority to U.S. Provisional Patent Application Ser. No. 62/460,909 filed Feb. 20, 2017, U.S. Provisional Patent Application Ser. No. 62/501,780 filed May 5, 2017, and U.S. Provisional Patent Application Ser. No. 62/620,032 filed Jan. 22, 2018; this application also claims priority and benefit of U.S. Provisional Patent Application Ser. No. 62/911,368 filed Oct. 6, 2019. The disclosures of all of the above patent applications are hereby incorporated herein by reference.

BACKGROUND

Field of the Invention

The invention is in the field of computer hardware.

Related Art

There are several approaches to multi-thread processing of computing instructions. However, these approaches typically require a significant overhead in hardware requirements. The added hardware produces both energy management and heat problems.

BRIEF DESCRIPTION OF THE DRAWINGS

FIG. 2 illustrates a timing diagram of memory port access, according to various embodiments of the invention.

SUMMARY

Figure 1:
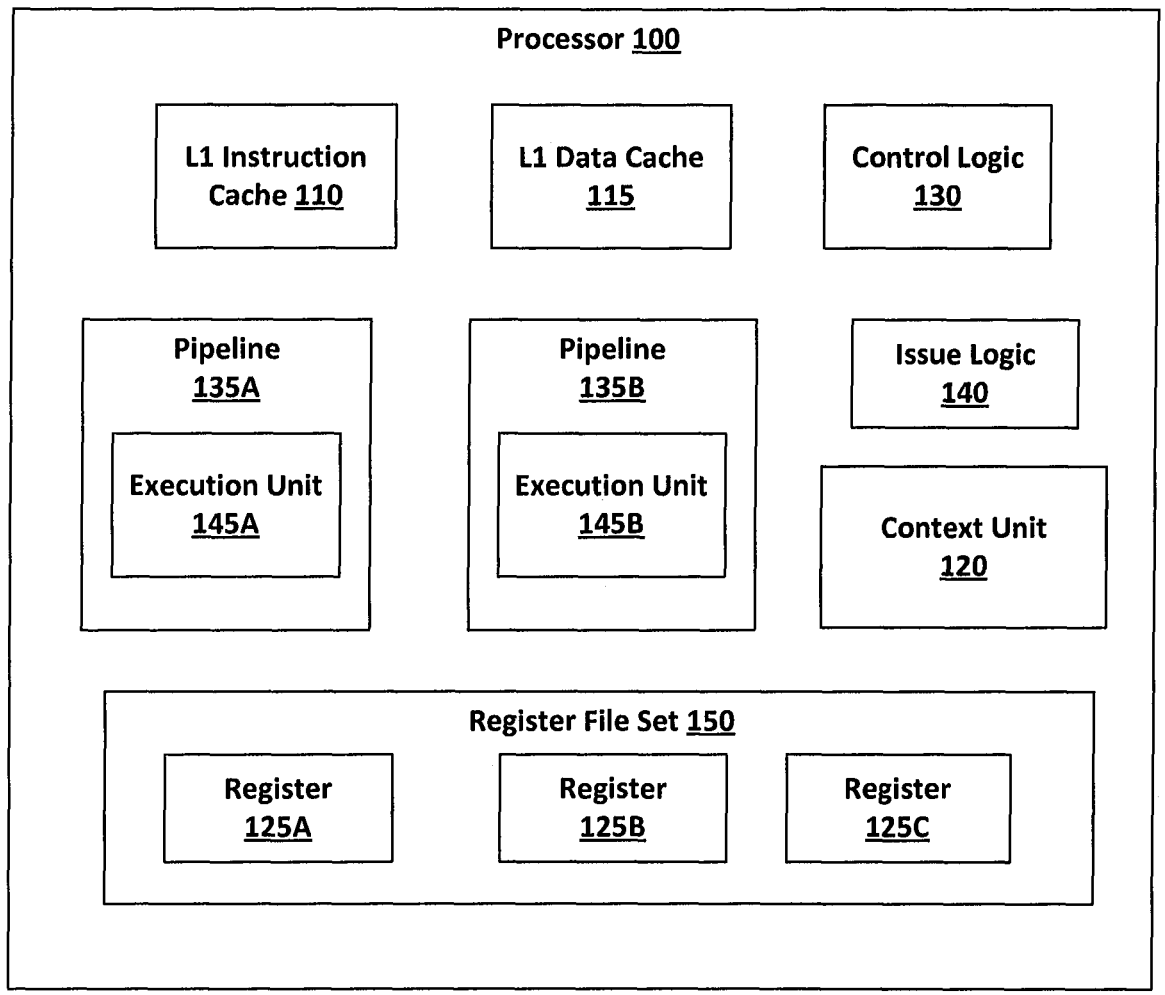
FIG. 1 illustrates a processor, according to various embodiments of the invention.

Various embodiments of the invention include an instruction fetch mechanism within a processor system that has multiple hardware contexts by which the processor system executes instructions from multiple instruction threads in some interleaved fashion. The instruction fetch mechanism fetches an entire cache block from the instruction cache or instruction memory as one unit and stores it into one of a plurality of temporary storage locations, where the temporary storage locations are each associated with a particular thread of execution. To execute instructions from a particular thread, they are taken from the local storage associated with that thread. When an instruction to be executed is not present in the local storage then a fetch is initiated to fill the local storage.

Various embodiments of the invention include a processor system comprising: a logical register file set including a plurality of physical memory arrays, each of the memory arrays having an access time and plurality of access ports, each register file of the register file set being assigned to a different hardware context; a plurality of hardware contexts, each of the hardware contexts comprising: one of the logical register files and a row of a context unit, the context unit including a plurality of rows associated with different hardware contexts, the row of the context unit further including: a program counter storage, an instruction block storage configured to store a block of instructions, logic configured to fetch the block from a cache, and logic configured to indicate that an instruction is ready to be issued from the row; a plurality of pipelines each including at least one execution unit; and issue logic configured to select a row from among the plurality of rows and to issue an instruction from the selected row to one of the plurality of pipelines, wherein the selection of the row is based on a ready state of the selected row, wherein the issue logic is configured to select the row such that the logical register file set is accessed at a frequency greater than one divided by the access time of a single memory array, by requiring instructions from the same hardware context to be spaced apart in time by a minimum of the number of clock cycles required to access that memory array through that port.

Various embodiments of the invention include a processor system comprising: a pipeline including an execution unit; an instruction cache; a context unit including a plurality of rows, each of the plurality of rows being assigned to an independent thread, each of the plurality of rows including at least one program counter, each of the plurality of rows including storage configured to store one or more instructions, each of the plurality of rows including logic configured to fetch the one or more instructions from the instruction cache, and each of the plurality of rows including logic configured to determine when an instruction is ready to be issued to the pipeline from the respective row; and issue logic configured to select a row from among the plurality of rows and to issue an instruction from the selected row to the pipeline.

Various embodiments of the invention include a method of executing a set of computing instructions, the method comprising: moving instructions associated with an instruction thread from memory into a hardware context row that is associated with the same instruction thread, the row including a program counter and storage configured to store the moved instruction, wherein there is a plurality of rows, each associated with a different instruction thread and each row holding a portion of a hardware context, and including control logic whose behavior depends upon the history of past actions plus inputs to the system and having at least two functions, where such control logic is optionally embodied by finite state machines with a first finite state machine configured to indicate that an instruction is ready to be issued from the respective row, and each of the plurality of rows including a second finite state machine configured to control fetching of one or more next instructions to be executed by the hardware context, wherein moving the instructions is responsive to the issuing of an instruction from the row, and moving the instruction takes an access time; the first finite state machine in a row determining that an instruction is ready to be issued from the row to a pipeline, which involves avoiding conflicts over instructions in progress attempting to use the same single-use internal resource, for example more than one attempting to access the same port of a particular memory array that stores instruction register data; choosing a row from among those that are ready to issue an instruction, and issuing the ready instruction from that row, which involves moving the instruction to the pipeline; updating the program counter of the row that issued an instruction, to reflect the address of the next instruction to be issued from that row; and executing the instruction using the pipeline wherein instructions are issued to the pipeline at a rate faster than the physical memory arrays, which store the data indicated by register addresses within the instructions, can be accessed.

Various embodiments of the invention include an instruction fetch mechanism within a processor system that has multiple hardware contexts by which the processor system executes instructions from multiple instruction threads in some interleaved fashion. The instruction fetch mechanism fetches an entire cache block from the instruction cache or instruction memory as one unit and stores it into one of a plurality of temporary storage locations, where the temporary storage locations are each associated with a particular thread of execution. To execute instructions from a particular thread, they are taken from the local storage associated with that thread. When an instruction to be executed is not present in the local storage then a fetch is initiated to fill the local storage. Optionally, wherein instructions are issued to the plurality of pipelines at a frequency faster than one over an access time of the physical memory arrays, which store the data indicated by register addresses within the instructions. Optionally, wherein the state of the first finite state machine is responsive to progress of execution of an instruction through the pipeline. Optionally, further comprising partial decoding the instruction while the instruction is in the row and determining a number of clock cycles until it is safe to issue the next instruction from the row, wherein the state of the first finite state machine is responsive to the number of clock cycles.

DETAILED DESCRIPTION

As used herein the term "independent threads" is used to refer to sets of computer instructions whose respective instructions are not dependent on each other, although independent threads may share general purpose memory.

As used herein the term "hardware context" is used to refer to hardware dedicated to executing an independent thread. In various embodiments, a hardware context can include a logical register file, a program counter storage, metadata representing state of the hardware context, and/or one or more execution units. A hardware context may include parts of a row of a context unit as discussed further elsewhere herein.

As used herein the term "control status register" is used to refer to a logical mechanism by which an instruction can gain meta-information about the state of the system or affect the state of the system, where the system includes both the processor core and mechanisms outside of the processor core such as interrupt controller, peripherals in the system (e.g., on-chip network), and/or the like. Functions of the control status register include tracking knowledge about past instruction executions, such as the total count of the number of instructions previously executed in the instruction stream, knowledge about the presence of an interrupt request, the ability to clear such an interrupt request, and/or to change the mode of processing or to configure co-processors, and so on.

As used herein the term "finite state machine" is used to refer to control logic that chooses actions based on a particular sequence of previous activity within the system. Such control logic uses system state to differentiate between alternative possible preceding paths. A finite state machine is configured to represent a current state based on prior events. The represented state is one of a finite plurality of allowed states.

FIG. 1 illustrates a Processor 100, according to various embodiments of the invention. Processor 100 includes circuits for executing software instructions. One or more of Processor 100 may be included in a computing device. In various embodiments, Processor 100 is implemented on a silicon chip, implemented in an FPGA, disposed within a single package or distributed among multiple packages. In some embodiments, more than one of Processor 100 is included in a single package.

In some embodiments, Processor 100 comprises a logical register file set 150, a plurality of Pipelines 135, a level 1 Instruction Cache 110, a level 1 Data Cache 115, System Control Logic 130, and a Context Unit 120. The logical Register File Set 150 is comprised of a plurality of logical Register Files 125A, 125B, 125C. The Pipelines 135 each contain an Execution Unit 145. The Execution units 145A and 145B perform calculations such as addition, subtraction, comparison, logical AND, logical OR, and so on. Multiple types of execution unit can be included, such as Floating Point, Vector, and/or the like. A Floating Point execution unit operates on data that encodes a number in the form of a mantissa plus an exponent. A Vector execution unit operates on a group of datums as a single operand. The elements of the group can be floating point format, or integer format, or some other format such as representing graphical data or some custom format.

Processor 100 further includes an optional Instruction Cache 110 configured to store computing instructions organized into sets. The computing instructions may be executed by two or more different independent threads. During execution, the computing instructions are typically copied to Instruction Cache 110 from memory external to Processor 100.

Processor 100 further includes an optional Data Cache 115 configured to store data to be processed by the computing instructions stored in Instruction Cache 110. The data stored in Data Cache 115 contains data that may be copied to and from memory external to Processor 100 and/or may be the result of instruction execution within Processor 100.

Processor 100 further includes one, two or more Pipelines 135, referenced individually as Pipeline 135A, 135B, etc. Pipelines 135 are configured to execution of software instructions. For example, Pipeline 135A may be configured to indicate it is ready for a new instruction, to receive an instruction, to decode the received instruction, obtain data on which the instruction will operate and then pass the instruction and data to Execution Unit 145A.

Each Pipeline 135 includes one or more dedicated Execution Units 145, individually referenced as 145A, 145B, etc. Execution Units 145 can include an arithmetic logic unit configured to do integer arithmetic and logic, a floating-point logic unit configured to operate on floating point data, a vector logic unit configured to perform vector operations, and/or the like. In some embodiments one or more of Execution Units 145 are shared by Pipelines 135.

Processor 100 further includes a register file set comprising two or more Register Files 125, individually labeled 125A, 125B, etc. Each of Register Files 125 is included in a different hardware context. Register Files 125 are logical constructs that may be mapped to actual physical memory arrays in a variety of different ways. For example, particular hardware contexts may be mapped to particular physical memory arrays accessible through access ports of the physical memory. A physical memory array may have 1, 2, 3 or more access ports, which can be used independently. Register Files 125 are characterized by an "access time." The access time is the time required to read or write data to or from the Register Files 125. The access time may be measured in clock cycles or absolute time.

Processor 100 further includes a Context Unit 120. Context Unit 120 includes a plurality of data structures, referred to herein as "rows", each associated with a different hardware context. A particular hardware context includes at least one logical register file, e.g., Register File 125A, and a row of Context Unit 120.

Context Unit 120 is configured to hold instructions in the rows until the instructions are ready to be executed using one of Pipelines 135. Issue Logic 140 is configured to control the issuance of instructions from the rows of Context Unit 120 to members of Pipelines 135.

Figure 3B:
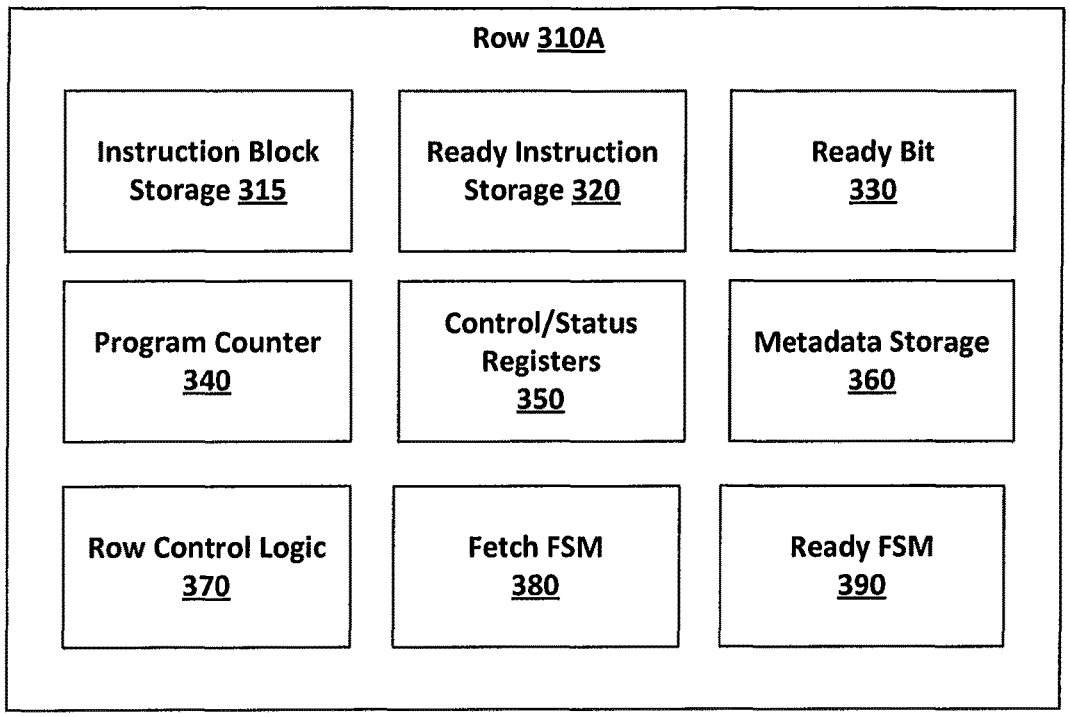
FIGS. 3A and 3B illustrate further details of a context unit, according to various embodiments of the invention.
Figure 3A:
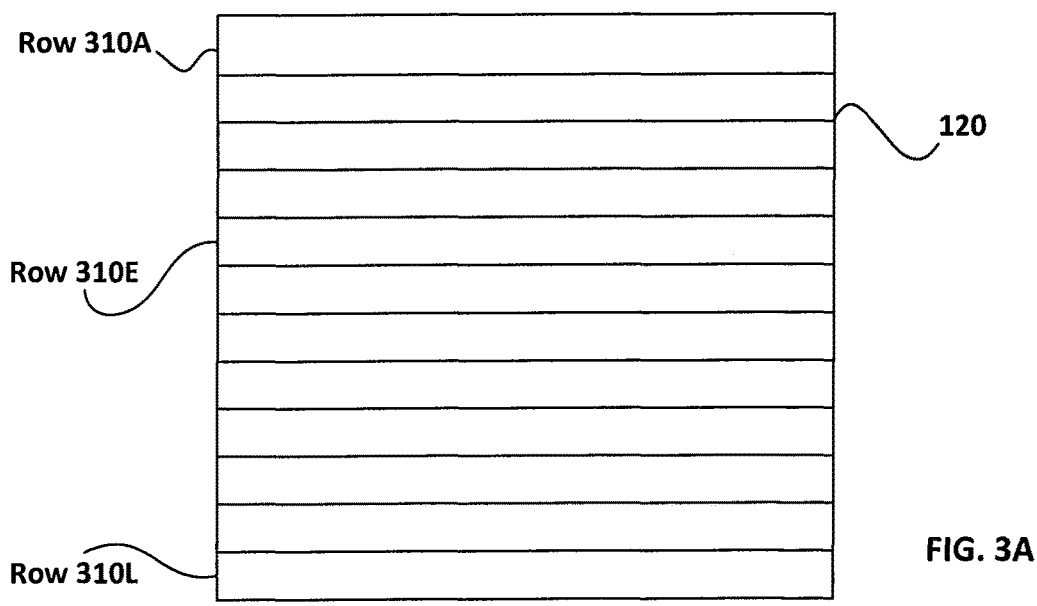

FIGS. 3A and 3B illustrate further details of Context Unit 120, according to various embodiments of the invention. Context Unit 120 includes a plurality of Rows 310, individually identified as Row 310A, Row 310B, etc. Each of Rows 310 is associated with a different hardware context. As such, each of Rows 310 is assigned to execution of a different independent software thread. Context Unit 120 includes at least two Rows 310, and can include, for example, 2, 4, 8, 16 or 32 rows, or any number of rows between these values. In some embodiments, Context Unit 120 includes more than 32 rows. Rows 310 may be mapped to any configuration of physical memory and physical logic. In some embodiments, Rows 310 are disposed within Processor 100 to minimize time and/or power required to move instructions from Rows 310 to Pipelines 135.

FIG. 3A illustrates further details of a Context Unit 120 including a plurality of Rows 310. While the Rows 310 of Context Unit 120 are referred to as "rows," the contents thereof do not necessarily need to be disposed in a row physical structure. Each "Row" 310 may be a logical mapping to physical memory and physical logic in variety of alternative structures.

FIG. 3B illustrates further details of Row 310A of Context Unit 120, as an example of a typical member of Rows 310, according to various embodiments. A Row 310A contains an Instruction Block Storage 315. Instruction Block Storage 315 can include, for example, memory configured to store 1, 2, 4, 8, 16 or other desired number of instructions. Instructions are transferred to Instruction Block Storage 315 from Instruction Cache 110 or instruction memory external to Processor 100. The transfer of instruction blocks is limited by the access time of the Instruction Cache 110 or instruction memory external to processor 100. Transfer from optional instruction Cache 110 or directly from external instruction memory to Instruction Block Storage 315 is controlled by history dependent control logic within each row that is optionally configured as a Fetch Finite State Machine 380. When the next instruction to be issued from a context is not present in Instruction Block Storage 315 then Fetch Finite State Machine 380 issues a request to cache 110 to fetch a new block of instructions. Arbitration logic that is contained within System Control Logic 130 ensures that no greater number of accesses are presented to cache 110 in a given cycle than the maximum number that cache 110 can initiate each cycle. System Control Logic 130 is configured to manage the transfer of instruction blocks from Cache 110. For example, System Control Logic 130 is configured to transfer blocks of instructions coming out of cache 110 to the appropriate row.

Ready Instruction Storage 320 is a logical element that may be a storage for one instruction expected to be issued next, or it may be an output of logic that selects an instruction from Instruction Block Storage 315.

History dependent control logic within Row 310A that is configured as Fetch Finite State Machine 380 requests transfer of instructions from Cache 110. Fetch Finite State Machine 380 is further configured to select the next instruction to issue out of Instruction Block Storage 315. Fetch Finite State Machine 380 is further configured to signal to Ready Finite State Machine 390 when the next instruction to issue from the row is present in the row. Ready Finite State Machine 390 receives signals from the pipeline that indicate when a control flow instruction, e.g., an instruction that can control an order in which instructions are executed, from that row is being executed in the pipeline, and it receives notice when that control flow instruction has resolved, e.g., when the order of instruction execution is determined. If the control flow instruction has caused a change in flow then the address of the new instruction is sent from Pipeline 135A to Fetch Finite State Machine 380. When the next instruction to issue from the row has an address that is not in Instruction Block Storage 315 then Fetch Finite State Machine 380 sends a request to Cache 110 to send a block of instructions that includes the next instruction to issue, and places these instructions into Instruction Block Storage 315. It then notifies Ready Finite State Machine 390 that the next instruction is present.

History dependent control logic within Row 310A that is configured as Ready Finite State Machine 390 determines when the next instruction is ready to be issued from Row 310A. Ready Finite State Machine 390 is configured to prevent access to a particular physical memory array port within Register File 125 that is associated with the same hardware context as the Row 310 that contains Ready Finite State Machine 390 from happening more than once within the access time of the respective memory array. Specifically, if the access time of a particular physical memory Port 420A is X clock cycles, then Ready Finite State Machine 390 is configured to require a delay of at least X clock cycles between starts of instructions that would access the same memory Port 420A.

Using this requirement, Pipelines 135 can still be configured to access the logical Register File Set 150 more than one time during the access time of a particular physical memory array, i.e., at a frequency greater than one divided by the access time of a particular memory array. This is achieved because Ready Finite State Machine 390 is configured to only enable issue of instructions from its Row 310A that access different memory ports and/or different Register Files 125 of Registrar File Set 150 from ones that are already occupied in performing an access.

Typical embodiments include multiple memory arrays 410, within Register File Set 150, and employs control logic inside of Ready Finite State Machine 390 that ensures that no two instructions will attempt to use the same port of the same physical memory array in an overlapped fashion. Successive instructions that are issued from Context Unit 120 to Pipelines 135 are carefully chosen such that the particular register entries to which their reads and writes are mapped will access different Ports 410 than any read or write that they will overlap with in time.

FIG. 2 illustrates a timing diagram of memory port access, according to various embodiments of the invention. Horizontal lines indicate that time during which a particular port is accessed. The length of the lines represent the access times (X) for the respective ports. The ports shown, A-E, may be divided among multiple memory arrays. A memory port A is first accessed at a Time 210 and the access is completed at a Time 220. Between Time 210 and Time 220, access to Ports B-E are initiated but not necessarily completed. Under the control of Control Logic 130 another attempt to access Port A is not made until a Time 230, after Time 220. Memory port B may be accessed less than X clock cycles after a read operation is initiated at memory port A. This staggered approach to register access allows register read and write operations in parallel at a frequency greater than would be possible if only a single port was being accessed.

Processor 100 further includes Issue Logic 140. Issue Logic 140 is configured to select a Row 310 from within Context Unit 120 and to issue an instruction from the selected row to one of Pipelines 135. It also issues the value of Program Counter 340 and the number of the row from which the instruction comes. The number of the row that the instruction is taken from is also sent and serves as the identifier of the context to which the instruction belongs.

Issue Logic 140 is typically configured to make the selection in response to an indication from one of Pipelines 135 that The Pipeline 135 is ready for a next instruction. The selection is based on the selected row being in a "ready state." As discussed further elsewhere herein, the ready state is optionally indicated by a "ready bit" or ready signal. When in the ready state a row is ready to issue the next instruction in an associated independent software thread. The position of that instruction within memory is indicated by Program Counter 340.

The identifier of the hardware context that the instruction is issued from is also sent to the pipeline together with the instruction and the program counter value. In some embodiments, the identifier of the hardware context is an identifier of the row from which the instruction is issued.

In some embodiments, each of Pipelines 135 includes one specific type of Execution Unit 145. In these embodiments, the selection of a Row 310 from which to issue an instruction is optionally further dependent on a match between the type of instruction that the Execution Unit 145 is configured to process and the type of instruction ready to be issued from particular members of Rows 310. This approach typically requires that the instructions be at least partially decoded while in Rows 310. In this approach either Ready Finite State Machine 390 performs the partial decode or Issue Logic 140 performs the partial decode.

In alternative embodiments Pipeline 135A, instructions may be issued to Pipeline 135A without regard to the type of Execution Unit(s) 145A associated with that particular pipeline. In this case, it may be discovered, after decoding an instruction, which the instruction is of the wrong type for Execution Unit 145A. As a result, Pipeline 135A will transfer the instruction after decode to a different member of the plurality of Pipelines 135, which contains the appropriate type of Execution Unit 145 for the instruction.

In some embodiments, Processor 100 includes a different instance of Issue Logic 140 for each type of Pipeline 135. In these embodiments, each instance of Issue Logic selects only instructions of the type appropriate for the pipeline(s) it is attached to. Optionally, each of Pipelines 135 is associated with its own instance of Issue Logic 140.

Row 310A further includes a Ready Bit 330. Ready Bit 330 is configured to be used by issue logic 140 to select a row from among the plurality of Rows 310 and to issue an instruction from the selected Row 310 to one of a plurality of Pipelines 135. On each clock cycle, Issue Logic 140 is configured to scan the Ready Bits 330 of rows 310, and selects from among the ones that have their Ready Bit 330 asserted. The selected row has its ready instruction taken from its Ready Instruction Storage 320 and sent to one of Pipelines 135. Thus, the issue logic 140 is responsive to a Ready Bit 330 asserted by Ready Finite State Machine 390 included in the selected row. If not all pipelines take the same format of operand, then Issue Logic 140 may optionally ensure that the instruction is of the correct format for the pipeline to which it is issued.

Each of Rows 310 further includes a Program Counter 340. When an instruction is issued to a Pipeline 135, it is accompanied by the address at which that instruction resides within the memory address space. Program Counter 340 is configured to hold this address. The control logic that exists inside of Finite State Machine 380 is configured to update the contents of Program Counter 340 to ensure that the contents are correct when an instruction is issued. The content of the respective Program Counter 340 (e.g., memory address) is sent to Pipeline 135 together with each instruction issued from a member of Rows 310.

Each of Rows 310 optionally further includes Control/Status Registers 350. Control and Status Registers 350 can include memory configured to store data indicative of a status of Processor 100 and/or serve as a port to control operation of Processor. Control and status registers serve as an interface mechanism that allows instructions to access meta information about the system and to manipulate the system. Such meta information includes, for example, the presence of a request for an interrupt, the cause of such a request, status information such as the total number of instructions executed by the thread since the last reset. Performing a write operation on a Control and Status Registers 350 may be used for: clearing a request for interrupt, changing the operating mode of a pipeline or co-processor, and/or the like. Some of the Control and Status Registers 350 are shared between multiple Rows 310, for example the control register that is used to access the real time clock, while other control and status Registers 350 are specific to individual members of Rows 310, for example the status register that is used to access the total number of instructions that have been completed from that row's context.

Each of Rows 310 further includes a Fetch Finite State Machine 380. Fetch Finite State Machine 380 is configured to manage blocks of instructions within Row 310A. This management includes, for example, issuing a request to fetch a new block of instructions from Cache 110, storing a received block of instructions in Instruction Block Storage 315, updating Program Counter 340 to ensure that holds the correct memory address when an instruction is issued from Row 310A, placing an instruction in Ready Instruction Storage 320, and sends signals to Ready Finite State Machine 390 (discussed further elsewhere herein). Specifically, Fetch Finite State Machine 380 is configured to fetch a block of instructions from L1 Instruction Cache 110 whenever the next instruction to issue from the row is not present in Block Storage 315. This condition can occur in many ways, including when all the instructions in Instruction Block Storage 315 have been processed or when a branch has been taken to an instruction not yet in Instruction Block Storage 315. Fetch Finite State Machine 380 is configured to increment Program Counter 340 if the next instruction in the block of instructions is the next instruction to be executed, or if a control flow instruction has occurred in the instruction thread, to store the computed target address of a branch or jump into Program Counter.

Fetch Finite State Machine 380 is configured to place an instruction in Ready Instruction Storage 320. Ready Instruction Storage 320 may be its own separate storage element, or it may be a system that selects one particular instruction out of Instruction Block Storage 315. Ready Instruction Storage 320 serves as the portal from which instruction issue logic 140 takes the instruction when it is issued from the row. When a next instruction is placed in Ready Instruction Storage 320 this fact is communicated to Ready Finite State Machine 390. Details of the requirements to place an instruction in Ready Instruction Storage 320, and indicate that the instruction is present, are discussed elsewhere herein. See, for example, FIGS. 5 and 6.

Each of Rows 310 further includes Ready Finite State Machine 390. Ready Finite State Machine 390 is configured to control the issuance of instructions from Row 310A to members of Pipelines 135A or 135B. Typically, the issued instruction is the one stored in Ready Instruction Storage 320 for the respective Row 310. In some embodiments, Ready Finite State Machine 390 is configured to track the execution progress of previous instructions from the same thread or optionally from other threads and may optionally receive information regarding of the types of previous instructions and the type of the instruction to be issued next. Based on the type and progress of previous instructions Ready Finite State Machine 390 is configured to indicate when the instruction in Ready Instruction Storage 320 is ready to be issued to a pipeline for execution. One criterion for the instruction being ready to issue is that Fetch Finite State Machine 380 first indicates that the next instruction to issue is currently available in Ready Instruction Storage 320. When Ready Finite State Machine 390 determines that instruction in Ready Instruction Storage 320 is ready, it signals this readiness by setting Ready Bit 330 accordingly. Note that in alternative embodiments, the functions of Fetch Finite State Machine 380 and Ready Finite State Machine 390 may be redistributed between these two elements of Row 310A.

Processor 100 further includes System Control Logic 130. System Control Logic 130 manages system level control operations, including managing requests made to instruction Cache 110 and Data Cache 115. System Control Logic 130 arbitrates among multiple requests made to the caches. System Control Logic 130 also tracks an identifier of the context from which an instruction was issued. System Control Logic 130 also manages sending signals between elements of Processor 100 that relate to the status of instruction execution. For example, System Control Logic 130 detects when a memory operation has completed access to Data Cache 115 and sends a signal indicating completion to the row that the instruction came from, and optionally an identifier of which instruction completed.

Figure 4:
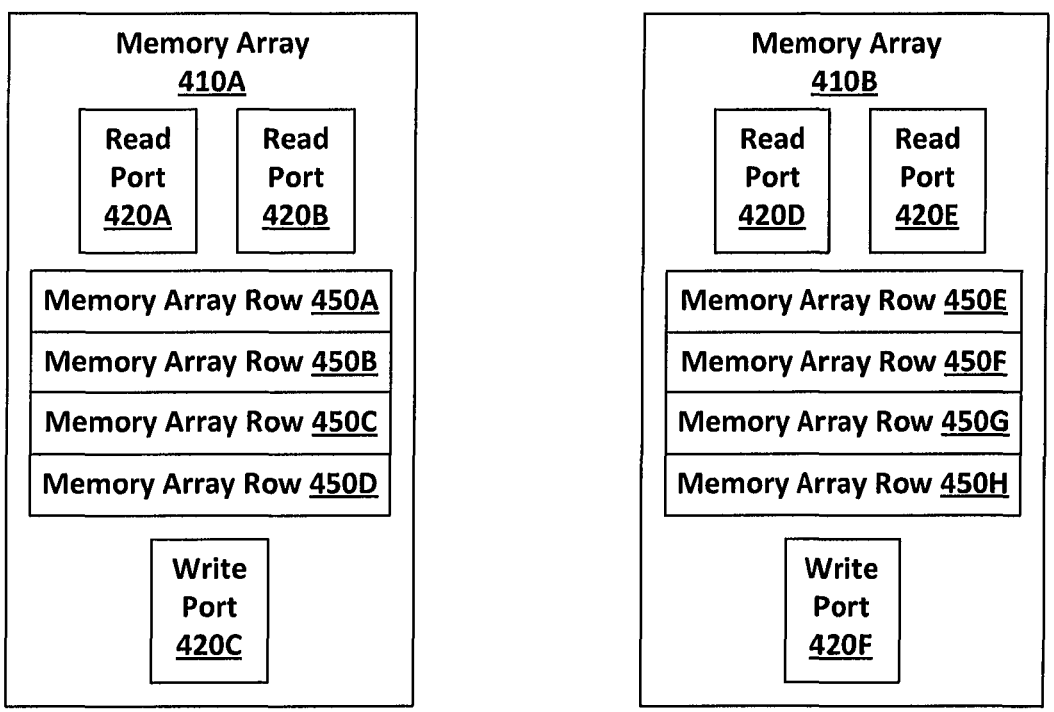
FIG. 4 illustrates a memory array, according to various embodiments of the invention.

FIG. 4 illustrates two Memory Arrays 410A and 410B, which each have three Ports 420, individually labeled 420A-420F, through which to access the contents of the Memory Array Rows 450A through 450H. Processor 100 further includes a plurality of Memory Arrays 410A, 410B and so on which are used to implement the Register Files 125 and are used within Instruction Cache 110 and Data Cache 115 and elsewhere. Memory Array 410 can be implemented as an SRAM array, an array of flip flops, an array of latches, or an array of specialized bit cells designed for use as register file memory. The arrays are optionally implemented with physical means to access the contents of Memory Array Rows 450, which is generally termed a Port 420. For example, Memory Array 410A has two read Ports (420A & 420B) and one write Port 420C, which allows a read to be taking place at the same time as a write is taking place.

Figure 5:
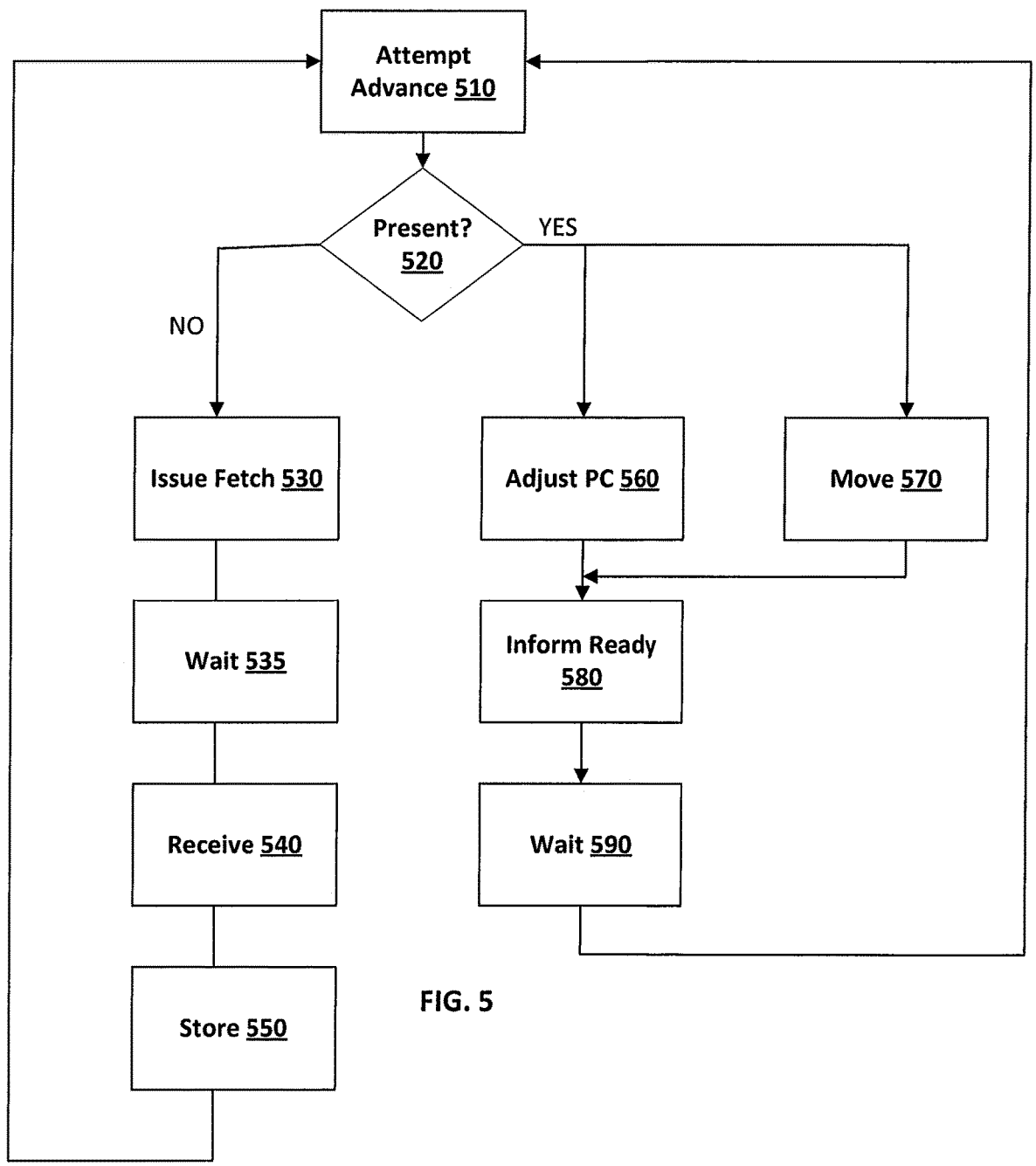
FIG. 5 illustrates methods of executing multiple independent threads, according to various embodiments of the invention.
Figure 6:
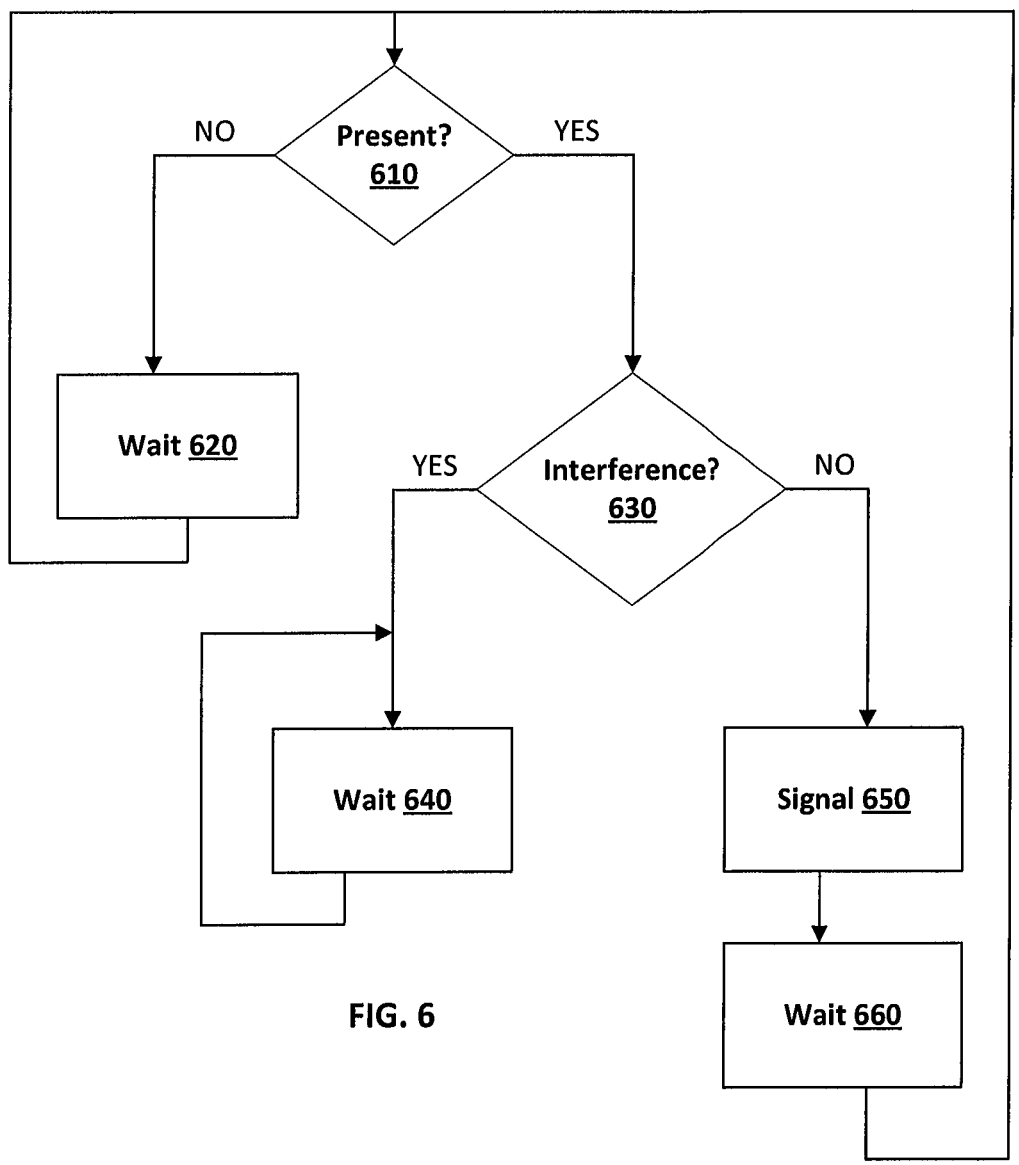
FIG. 6 illustrates the process of ensuring that an instruction in a row is ready to be issued and then signaling its readiness, according to various embodiments of the invention.
Figure 7A:
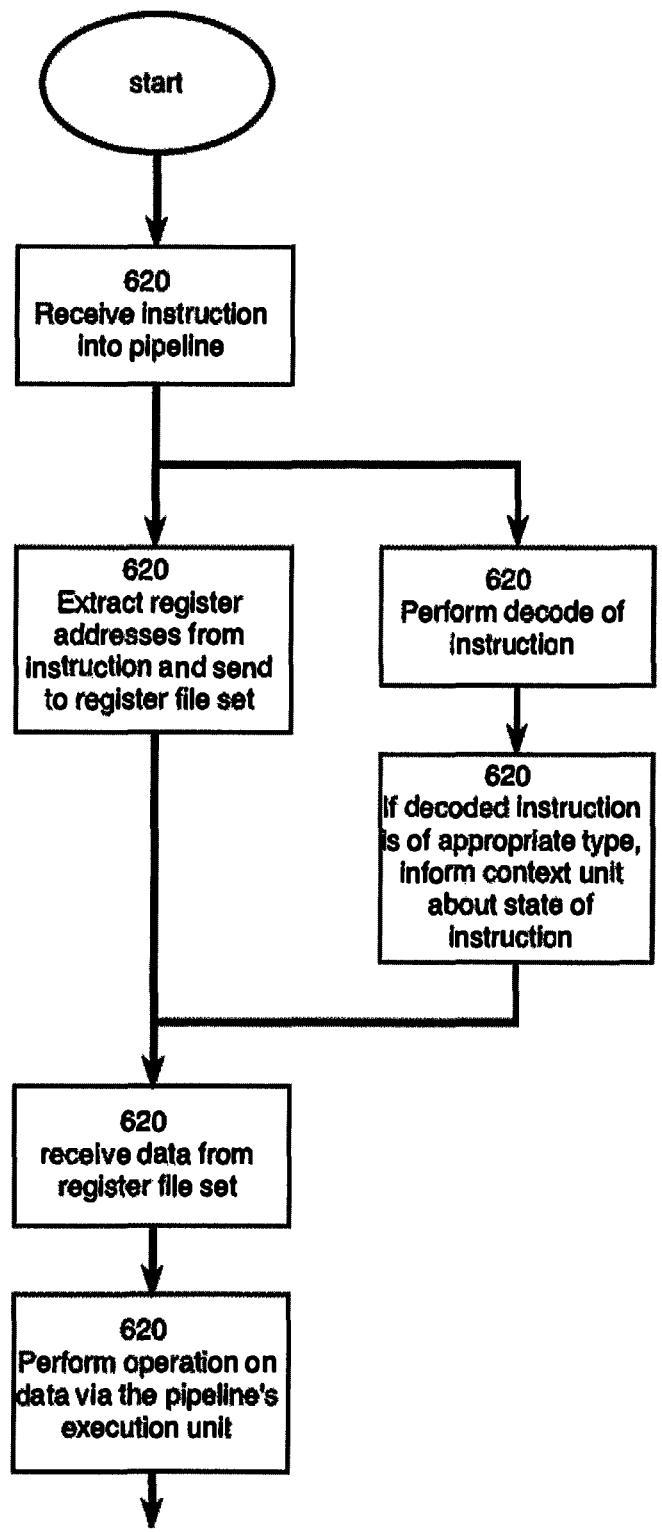
FIGS. 7A and 7B illustrate the process of executing an instruction, according to various embodiments of the invention.
Figure 7B:
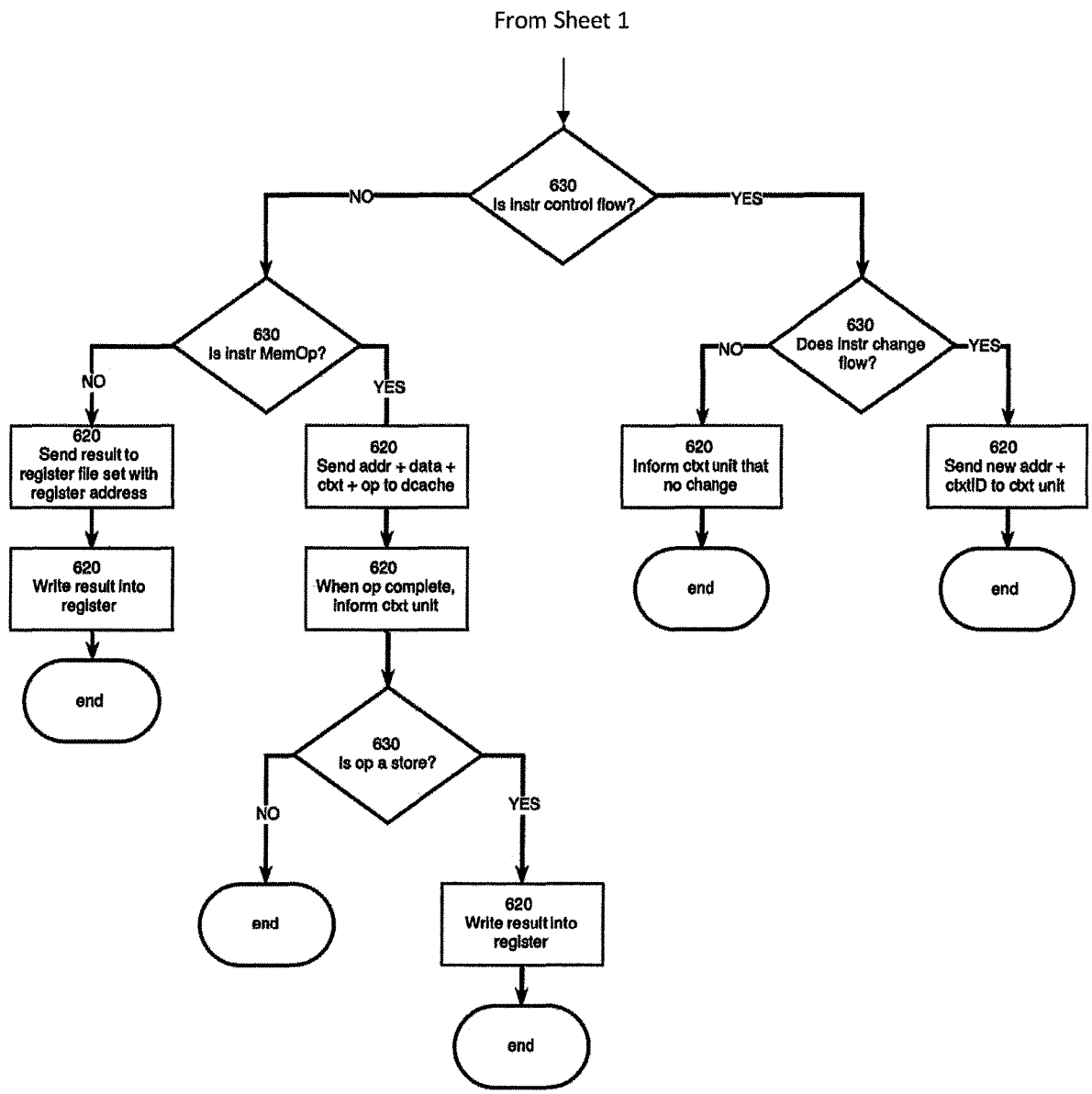

FIGS. 5, 6, 7, and 8 illustrate methods of executing multiple independent threads, according to various embodiments of the invention. The methods comprise multiple concurrent processes that interact. FIG. 5 illustrates the process of fetching instructions from the memory system into a Row 310. FIG. 6 illustrates the process of ensuring that an instruction in a row is ready and then signaling its readiness. FIG. 7 illustrates the process of executing an instruction and signaling its progress and outcome. FIG. 8 illustrates the process of performing a memory operation and signaling its status.

FIG. 5 illustrates the process of fetching instructions form the memory system into a Row 310. The process begins at an Attempt Advance Step 510 where Fetch Finite State Machine 380 attempts to advance to the next instruction in Instruction Block Storage 315. This step fails if the next instruction to execute in the thread has an address that is outside the addresses of the instructions in Instruction Block Storage 315.

In Present? Step 520 a next action is chosen based on whether the advance to the next instruction was successful. If not successful, then the next step is Issue Fetch 530 wherein a fetch request is issued.

Issue Fetch Step 530 occurs when the next instruction to execute in the thread is not present in the local Instruction Block Storage 315 of the respective Row 310. In this case, Fetch Finite State Machine 380 issues a fetch request to Instruction Cache 110. Many of Rows 310 may issue requests in overlapped fashion, however Instruction Cache 110 may only be able to process fewer requests than are issued. To handle this case, System Control Logic 130 includes arbitration logic that organizes the sequence of requests entering Instruction Cache 110.

In a Wait Step 535 the system waits for the Instruction Cache 110 to retrieve/provide the indicated instructions. This may involve a cache miss, in which case the instruction must be fetched from memory outside of Processor 100. A cache miss requires some amount of time to complete the request.

In a Receive Step 540 a block of instructions is received from Instruction Cache 110.

In a Store Instructions Step 550 the received block of instructions is stored into Instruction Block Storage 315 of the respective Row 310. Once Store Instructions Step 550 is complete, the method returns to Present? Step 520.

At Present? Step 520, if the answer is yes, then steps 560 and 570 are performed in parallel.

In an Adjust PC Step 560 the program counter is adjusted so that it has the correct address of the instruction that is present in Ready Instruction Storage 320.

In A Move Step 570 the next instruction to be executed by the thread is made available in Ready Instruction Storage 320, from which the instruction will be issued by Issue Logic 140 to a chosen Pipeline 135.

In an Inform Ready Step 580 Fetch Finite State Machine 380 sends a signal to Ready Finite State Machine 390 that the instruction is present in Ready Instruction Storage 320.

In a Wait Step 590 the process waits for a signal from Issue Logic 140 indicating that the row has been chosen to issue an instruction. Once this signal is received, Fetch Finite State Machine 380 loops to Step 510 to attempt to advance to making the next instruction in the instruction stream become present in Ready Instruction Storage 320.

FIG. 6 illustrates the process of ensuring that an instruction in a row is ready to be issued and then signaling its readiness. This process optionally takes place in every Row 310 simultaneously and/or in parallel. Once started, the rows continue this process endlessly until the processor system is reset, or optionally some configuration is performed that disables one of Rows 130, such as through the Control and Status Registers 350.

The process begins at Present? Step 610 where a check is performed inside Ready Finite State Machine 390 to determine whether the next instruction to issue from the Row 310 is present in Ready Instruction Storage 320.

If the instruction is not present, then in a Wait Step 620 Ready Finite State Machine 390 waits until Fetch Finite State Machine 380 signals that it is present. Then the process proceeds to an Interference? Step 630.

If the instruction is present in Present? Step 610, then the process proceeds directly to Interference? Step 630.

Interference? Step 630 takes place within a single member of Rows 130, and involves multiple elements from that Row 310. Interference? Step 630 checks whether there may be interference between instruction in Ready Instruction Storage 320 and instructions that were previously issued from the same member of Rows 130. Such interference can include conditions such as the port of the physical memory array accessed by the registers specified in the instruction present in Ready Instruction Storage 320 will be in use by a different instruction if instruction in Ready Instruction Storage 320 were to be issued on the next cycle. Another example is when the instruction in Ready Instruction Storage 320 is a memory access instruction, but there is a previous memory access instruction from the same Row 310 still being executed.

If there is interference, then the process proceeds to Wait Step 640. In Wait Step 640, Ready Finite State Machine 390 waits until all interference has resolved. Ready Finite State Machine 390 detects resolution by receiving signals from a plurality of other portions of Processor 100 where those signals indicate the status of instructions that were previously issued. Examples of such signals include the System Control Logic 130 sending a signal indicating completion of a memory access instruction to the Row 310 that issued the instruction upon completion of the access by the L1 Data Cache 115. System Control Logic 130 tracks the context from which each instruction is issued and uses this information to deliver the signal to the correct Row 310. The Ready Finite State Machine 390 in the row that received the signal then updates its state due to receipt of the signal. If receipt of that signal clears all interference associated to the instruction in Ready Instruction Storage 320 then Ready Finite State Machine 390 stops waiting and the process proceeds to A Signal Step 650.

In Signal Step 650 Ready Bit 330 is asserted, which is the signal to Issue Logic 140 that informs Issue Logic 140 that the Row 310 that contains the Ready Bit 330 is ready to have its instruction held in Ready Instruction Storage 320 issue to the pipeline. The process then proceeds to A Wait Step 660.

In Wait Step 660, both Fetch Finite State Machine 380 and Ready Finite State Machine 390 wait for the member of Rows 130 that contains them to be selected by Issue Logic 140. Issue Logic 140 provides a signal to both finite state machines when Issue Logic 140 selects the Row 310 that contains them. When the wait is over, the process loops back to Present? Step 610.

FIG. 7 illustrates the process of executing an instruction and signaling its progress and outcome. This process begins at the start stage each cycle in each of Pipelines 135 when an instruction is issued to the pipeline.

In a Receive Instruction Step 705 a valid instruction is received into Pipeline 135A. The instruction is transferred from a selected member of Rows 130 by Issue Logic 140. The process next goes to both an Extract Register Addresses Step 710 and a Decode Step 715, optionally in parallel.

In Extract Register Addresses Step 710 bits are extracted from the received instruction. Most instructions of most instruction set architectures specify one or more registers that hold the inputs to the instruction. The extracted bits identify the logical registers that hold the data to use as input to the execution unit. The bits that indicate a register are sent to Register File Set 150 where they are used to access a particular location from a particular memory array through a particular memory port. The process then proceeds to a Receive Register Contents Step 725.

In Decode Step 715 the received instruction is decoded, which determines the type of instruction, the kind of execution unit it requires, and/or the like. The type of instruction sometimes determines how many clock cycles the instruction will take and, thus, how soon the next instruction in the stream can be issued.

In a Conditionally Inform Row Step 720, if the instruction is of a type that allows it to be followed closely then in this step the Pipeline 135A sends a signal to System Control Logic 130 which in turn delivers the signal to the member of Rows 130 from which the instruction was issued. In the member of Rows 130 that receives the signal, the Ready Finite State Machine 390 uses the signal in its determination of whether the next instruction from that row is ready to be issued. This step is optionally accomplished in other ways such as placing a partial decoder and counter in Ready Finite State Machine 390 that counts down the number of clock cycles it has to wait until interference with this type of instruction is no longer possible.

In a Receive Register Contents Step 725 the data to be operated upon is received by Pipeline 135A and is used as input to the Execution Unit 145A that is inside Pipeline 135A.

In a Perform Operation Step 730 the instruction executes in Execution Unit 145.

A Flow Control Step 735 is a decision point in the process. If the instruction is not a control flow type then the next step is 740. If it is a control flow type then the next step is 775. A flow control type is a type of instruction that can control the order in which instructions are executed.

A MemOp? Step 740 is a decision point in the process. If the instruction type is not a memory operation such as a load instruction or a store instruction then the next step is a Send Result Step 745. If it is a memory operation then the next step is a Send MemOp Step 755.

Sent Result Step 745 is for a non-control flow and non-memory operation. For this type of instruction, a result of execution is normally generated by the Execution Unit 145, and this result is sent to the Register File Set 150 by System Control Logic 130. The next step is a Write Result Step 750.

In Write Result Step 750 the result sent from Pipeline 145 is written into a physical memory. It is guaranteed that the port of the memory array that the result is written into is free because Ready Finite State Machine 390 is configured to only make instructions ready for issue to Pipelines 135 if there will be no conflicts during this step of writing the result. Alternatively, System Control Logic 130 can be configured to ensure that no two writes occupy the same port of the same physical memory array in an overlapped fashion.

Send MemOp Step 755 is for memory operation type of instructions. In this step, the memory operation to perform, the memory address, and optionally the data to write are made available to System Control Logic 130 which arbitrates among the many pipelines trying to access to the Data Cache 115. Next is an Inform ctxt Unit Step 760.

Inform ctxt Unit Step 760 takes an arbitrary amount of time, during which the memory system is accessed and the memory operation completes. Upon completion of the memory operation the System Control Logic 130 informs the Row 310 from which the instruction was issued that it has completed. The Ready Finite State Machine 390 in that row uses this information in its determination of whether that Row 310 is ready to issue its next instruction. Next is Store? Step 765.

Store? Step 765 is a decision point in the process. If the completed memory operation is a load instruction then the next step is Write Result Step 770. If it is not a load instruction then that is the end of execution of that instruction.

Write Result Step 770 is for load instructions. The result retrieved from the memory system is sent to the Register File Set 150 where the data is written into a physical memory array. This is the end of execution of this instruction.

Change Flow? Step 775 is for control flow instructions. It is a decision point in the process. Upon completion of processing on an instruction by Execution Unit 145 it is known whether the control flow instruction is taken or not. If it is not taken then the next step is an Inform ctxt Unit Step 780. If it is taken then the next step is Send New Addr 785.

Inform ctxt Unit Step 780 uses System Control Logic 130 to inform the Row 310 from which the instruction was issued that the branch was not taken. The Fetch Finite State Machine 380 uses this information to determine the instruction to place into Ready Instruction Storage 320. This is the end of execution of this instruction.

Send New Addr Step 785 is for control flow instructions in which alteration of control flow does take place. An example of a control flow instruction is a taken branch instruction and another example is a jump instruction. In Send New Addr Step 785, System Control Logic 130 is used to transfer the new instruction address to the row from which the control flow instruction was issued. This address is received by Fetch Finite State Machine 380 and determines what instruction is placed into Ready Instruction Storage 320. This is the end of the execution of this instruction.

Several embodiments are specifically illustrated and/or described herein. However, it will be appreciated that modifications and variations are covered by the above teachings and within the scope of the appended claims without departing from the spirit and intended scope thereof. For example, as used herein physical memory arrays can include an SRAM array, or an array of flip flops or latches or an array of transistors arranged as specialized register bit cells.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

The logic discussed herein may include hardware, firmware and/or software stored on a computer readable medium. This logic may be implemented in an electronic device to produce a special purpose computing system.

What is claimed is:

1. A processor system comprising:
a first pipeline including an execution unit of a first type;
an instruction cache;
a context unit including a plurality of rows,
    each of the plurality of rows being assigned to an independent software thread,
    each of the plurality of rows including at least one program counter,
    each of the plurality of rows including storage configured to store one or more instructions, and
    each of the plurality of rows including logic configured to determine that an instruction is ready to be issued to the first pipeline from the respective row; and
issue logic configured to select a row from between members of the plurality of rows that have an instruction that is ready, and to issue an instruction from the selected row to the first pipeline, the selection being based on the determination that an instruction is ready to be issued to the first pipeline from the respective row, two or more of the rows having an instruction that is ready at the same time.

2. The system of claim 1, wherein the logic configured to determine that an instruction is ready is responsive to a history of past actions in the respective row.

3. The system of claim 1, wherein each of the plurality of rows is part of a different hardware context and each hardware context is assigned to execute a different independent software thread.

4. The system of claim 3, wherein each of the plurality of rows includes register file memory.

5. The system of claim 4, wherein the instruction cache and the register file memory are implemented together on a silicon chip.

6. A processor system comprising:
a pipeline including an execution unit;
an instruction cache;
a context unit including a plurality of rows,
  each of the plurality of rows being assigned to an independent software thread,
  each of the plurality of rows including at least one instruction pointer,
  each of the plurality of rows including storage configured to store a block of instructions,
  each of the plurality of rows including logic configured to fetch the one or more instructions from the instruction cache; and
  each of the plurality of rows including logic configured to determine that an instruction is ready to be issued to the pipeline from the respective row; and
issue logic configured to select a row from among the plurality of rows and to issue an instruction from the selected row to the pipeline.

7. The system of claim 6, wherein the logic configured to determine that an instruction is ready is further configured to send a register number specified by the instruction to a register file prior to the instruction being ready to be issued to the pipeline.

8. A processor system comprising:
a pipeline including an execution unit;
an instruction cache;
a context unit including a plurality of rows,
  each of the plurality of rows being assigned to an independent software thread,
  each of the plurality of rows including at least one instruction pointer,
  each of the plurality of rows including storage configured to store one or more instructions,
  each of the plurality of rows including logic configured to fetch the one or more instructions from the instruction cache,
  each of the plurality of rows including a register file dedicated to the respective member of the plurality of rows, the register file being configured to store data on which the instructions from the instruction cache operate, and
  each of the plurality of rows including logic configured to determine that an instruction is ready to be issued to the pipeline from the respective row; and
issue logic configured to select a row from among the plurality of rows and to issue an instruction from the selected row to the pipeline, wherein the issue logic is configured to issue instructions from the plurality of rows to the pipeline at a rate that is greater than a rate at which the register file of any individual member of the plurality of rows can be accessed.

9. A method of executing a set of computing instructions, the method comprising:
moving instructions associated with an instruction thread from memory into a hardware context row that is associated with the same instruction thread, the row including storage configured to store the moved instructions, wherein there is a plurality of hardware context rows, each context row associated with a different instruction thread, each row holding a portion of a hardware context, and including control logic whose behavior depends upon the history of past actions plus inputs to the system and having at least two functions, a first part of the control logic being configured to indicate that an instruction is ready to be issued from the respective row, and the respective row including a second part of the control logic configured to control fetching of one or more next instructions to the hardware context, wherein moving the instructions is responsive to the issuing of an instruction from the row, and moving the instruction takes an access time;
the first part of the control logic in each row determining that an instruction is ready to be issued from the row to a pipeline, the determination avoiding conflicts over instructions in progress attempting to use the same internal resource;
choosing a row from among those that are ready to issue an instruction, and issuing the instruction that is ready to issue from that row to the pipeline;
updating the row that issued an instruction, to reflect the address of the next instruction to be issued from that row; and
executing the instruction using the pipeline,
wherein instructions are issued to the pipeline from the plurality of rows at a first maximum rate, and a register file associated with each respective hardware context is accessed at a second maximum rate limited by characteristics of a physical memory array configured to store register file data, wherein the first maximum rate is higher than the second maximum rate.

10. The method of claim 9, wherein the fetching of one or more next instructions to the hardware context includes fetching an entire cache line from an instruction cache and storing the fetched cache line in the row associated with the hardware context.

11. The method of claim 9, wherein the internal resource includes a port of a particular memory array that stores register file data.

12. The method of claim 9, wherein the control logic is responsive to progress of execution of an instruction through the pipeline.

13. The method of claim 9, further comprising only partially decoding the instruction while the instruction is in the row and determining a number of clock cycles until it is safe to issue the next instruction from the row, wherein the control logic is responsive to the number of clock cycles.

14. The method of claim 9, wherein the first part of the control logic includes a finite state machine that tracks a state of preciously issued instructions and the second part of the control logic includes a finite state machine that tracks a state of the first finite state machine and a state of issued fetches.

15. The system of claim 1, wherein the logic configured to fetch the one or more instructions from the instruction cache is configured to fetch a group of instructions at time from the instruction cache and store the group of instructions in the respective row.

16. The system of claim 15, wherein the group of instructions includes an entire cache line of instructions.

17. The system of claim 1, wherein the logic configured to determine that an instruction is ready from the respective row uncludes a finite state machine that tracks a state of previously issued instructions and the issue logic includes a finite state machine that tracks a state of the first finite state machine and a state of issued fetches.

18. The system of claim 1, wherein the logic, in each row, configured to determine that an instruction is ready to be issued is configured to offer instructions that are ready and the issue logic is configured to select among a plurality of offered instructions for issuing to the first pipeline.

19. The system of claim 1, further including a second pipeline of a second type, the issue logic being configured to issue instructions to both the first pipeline and the second pipeline depending on a type of the instruction, wherein the first and second pipelines are of two different types.

20. The system of claim 1, wherein each of the plurality of rows is associated with a respective finite state machine configured to determine when an instruction is ready, responsive to the execution unit of the first type.

21. The system of claim 1, wherein each of the plurality of rows including logic configured to fetch the two or more instructions from the instruction cache in a single a single cache request.

22. The system of claim 1, wherein each of the plurality of rows including logic configured to fetch an entire cache block of instructions from the instruction cache in a single a cache request.

* * * * *